(12) United States Patent
Vivanco et al.

(10) Patent No.: US 8,792,379 B1
(45) Date of Patent: Jul. 29, 2014

(54) DETERMINING LINK CAPACITY

(75) Inventors: Daniel Vivanco, Sterling, VA (US);
Shahzada Rasool, Sterling, VA (US); Yu Zhou, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 64 days.

(21) Appl. No.: 13/587,817

(22) Filed: Aug. 16, 2012

(51) Int. Cl.
*H04L 12/26* (2006.01)

(52) U.S. Cl.
USPC ............................ 370/252; 370/232; 370/400

(58) Field of Classification Search
USPC ...................... 370/230.1, 231–235, 252–253, 370/335–336, 342–343, 345, 400–401, 370/441–442, 479–480
See application file for complete search history.

(56) References Cited

U.S. PATENT DOCUMENTS

| | | | | |
|---|---|---|---|---|
| 5,583,792 | A | * | 12/1996 | Li et al. .......................... 709/224 |
| 7,046,678 | B2 | * | 5/2006 | Jiang et al. ................ 370/395.41 |
| 7,545,749 | B2 | * | 6/2009 | Jourdain et al. ............... 370/235 |
| 7,602,791 | B1 | * | 10/2009 | Jiang et al. ................ 370/395.41 |
| 7,885,185 | B2 | | 2/2011 | van den Berg et al. |
| 2006/0182039 | A1 | * | 8/2006 | Jourdain et al. ............... 370/252 |
| 2007/0121499 | A1 | * | 5/2007 | Pal et al. ........................ 370/230 |
| 2007/0217539 | A1 | * | 9/2007 | Ihm et al. ....................... 375/267 |
| 2010/0002600 | A1 | * | 1/2010 | Jiang et al. ..................... 370/252 |
| 2011/0317683 | A1 | * | 12/2011 | Branlund et al. ............. 370/344 |
| 2012/0263055 | A1 | * | 10/2012 | Liu et al. ........................ 370/252 |
| 2014/0016468 | A1 | * | 1/2014 | Daraiseh et al. ............... 370/235 |

* cited by examiner

*Primary Examiner* — Kevin Mew

(57) ABSTRACT

In a system and method of determining a link capacity between an access node and a wireless device in a wireless communication network, sending over a communication link from the access node to the wireless device a plurality of packets comprising a packet size and a data length based on a modulation and coding scheme assigned to the communication link, determining a dispersion of at least two of the packets sent to the wireless device, calculating an average dispersion rate based on the determined dispersion of the at least two packets and the data length, and determining an available link capacity based on the packet size and the average dispersion rate.

20 Claims, 7 Drawing Sheets

DETERMINING LINK CAPACITY

TECHNICAL BACKGROUND

The performance level of communication links in a wired or wireless communication network is based in part on the link capacity of communication links. Greater link capacity correlates with, for example, higher data throughput, which allows a communication network to provide greater guaranteed quality of service (QoS) to a receiving device. Determining communication link capacity is an important operation for communication network providers, in order to monitor deployed capacity, plan capacity upgrades, and to detect congested or underutilized communication links.

Overview

In an embodiment, over a communication link from an access node to a wireless device, a plurality of packets is sent comprising a packet size and a data length based on a modulation and coding scheme assigned to the communication link. A dispersion of at least two of the packets sent to the wireless device is determined, and an average dispersion rate is calculated based on the determined dispersion of the at least two packets and the data length. Based on the packet size and the average dispersion rate, an available link capacity is determined.

DETAILED DESCRIPTION

In an embodiment, a plurality of packets comprising a packet size and a data length based on a modulation and coding scheme assigned to a communication link is sent over the communication link from an access node to a wireless device. A dispersion of at least two of the packets sent to the wireless device is determined, and based on the determined dispersion of the at least two packets and the data length an average dispersion rate is calculated. Based on the packet size and the average dispersion rate, an available link capacity is determined. In an embodiment, the packet size and data length are based on the modulation and coding scheme assigned to the communication link and an overhead load of the plurality of packets. In an embodiment, the packet size is based on a packet size factor and a maximum number of symbols supported by the MCS assigned to the communication link.

Figure 1:
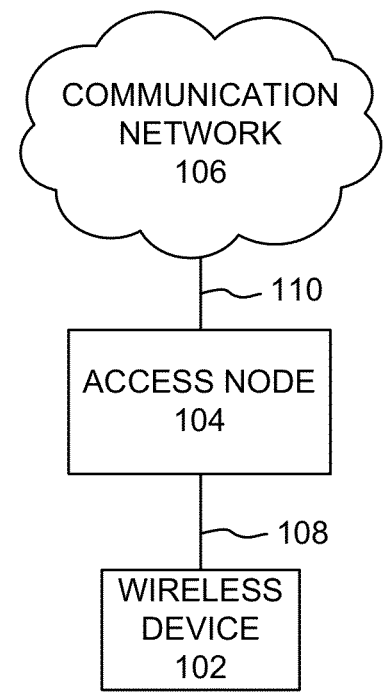
FIG. 1 illustrates an exemplary communication system to determine a link capacity between an access node and a wireless device.

FIG. 1 illustrates an exemplary communication system 100 to determine a link capacity between an access node and a wireless device comprising wireless device 102, access node 104, and communication network 106. Examples of wireless device 102 can include a cell phone, a smart phone, a computing platform such as a laptop, palmtop, or tablet, a personal digital assistant, or an internet access device, including combinations thereof. Wireless device 102 is in communication with access node 104 over communication link 108.

Access node 104 is a network node capable of providing wireless communications to wireless device 102, and can be, for example, a base transceiver station, a radio base station, an eNodeB device, or an enhanced eNodeB device. Access node 104 is in communication with communication network 106 over communication link 110.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 may also comprise a wireless network, including base stations, wireless communication nodes, telephony switches, internet routers, network gateways, computer systems, communication links, or some other type of communication equipment, and combinations thereof. Wired network protocols that may be utilized by communication network 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 100 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 104 and communication network 106 which are omitted for clarity, including additional processing nodes, routers, gateways, and physical and/or wireless data links for carrying data among the various network elements.

In an embodiment, over a communication link from an access node to a wireless device, a plurality of packets is sent comprising a packet size and a data length based on a modulation and coding scheme assigned to the communication link. A dispersion of at least two of the packets sent to the wireless device is determined, and based on the determined dispersion of the at least two packets and the data length an average dispersion rate is calculated. Based on the packet size and the average dispersion rate, an available link capacity is determined.

Figure 2:
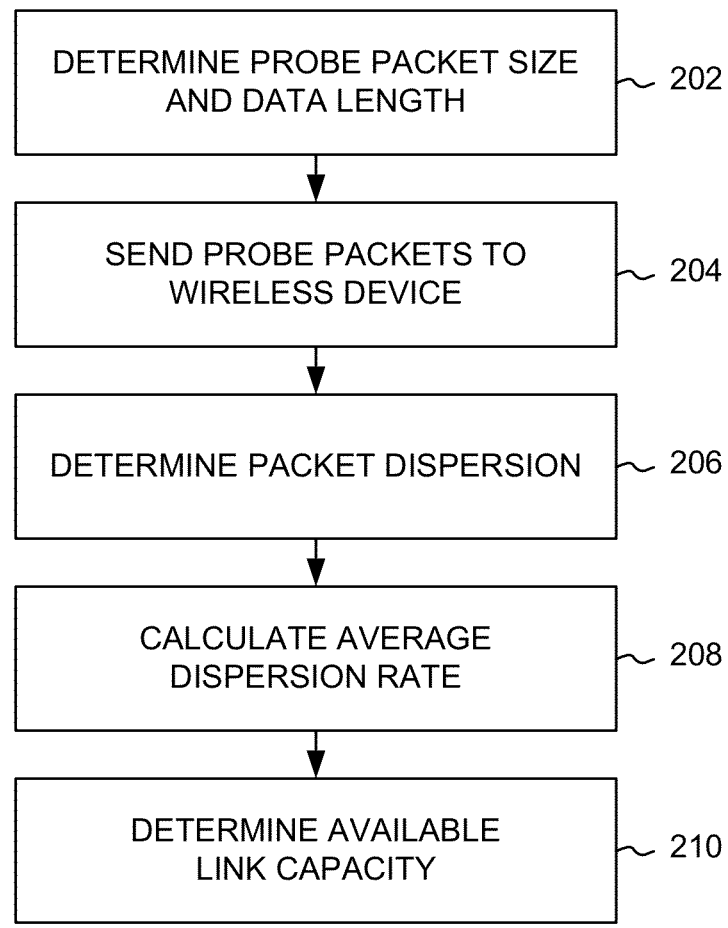
FIG. 2 illustrates an exemplary method of determining a link capacity between an access node and a wireless device.

FIG. 2 illustrates an exemplary method for determining a link capacity between an access node and a wireless device. In operation 202, a probe packet size and data length are determined. A probe packet size can be determined for a plurality of probe packets appropriate for the transmission time interval (TTI) of wireless communication system 100. Data can divided into units at a transmitter, such as access node 104, wherein the length of time required to transmit one such unit determines the TTI. Thus, in an embodiment, data packets in a wireless communication network can be transmitted from access node 104 to wireless device 102 based on a TTI. In a wireless communication system employing adaptive coding and modulation to send data over a wireless communication link, the selected modulation and coding scheme (MCS) can affect the amount of data that can be sent over the wireless communication link per unit time, which in turn will affect the TTI. Use of adaptive modulation and coding therefore adds complexity to a determination of probe packet size, because the probe packet size should be set to take into account both the MCS and the network TTI settings. Thus, in an embodiment, a probe packet size can be determined for a plurality of probe packets based on the MCS assigned to the communication link. In general, the larger the probe packet size, the larger the resultant dispersion of packets arriving at wireless device 102, because the probe packets can be fragmented into more than one TTI, which increases the susceptibility of the probe packets to separation by cross-traffic interference and other network conditions. Conversely, if probe packet size is too small an erroneous dispersion measurement may result, as packets may be more sensitive to a time stamping resolution at a receiving device, such as wireless device 102.

In operation 204, a plurality of probe packets are sent from access node 104 to wireless device 102. Using the determined probe packet size, a plurality of data packets of a determined data length can be sent from access node 104 to wireless device 102 over communication link 108. The data length can be determined to provide a sufficient number of the plurality of probe packets to determine a packet dispersion, as further described below. As the selected modulation and coding scheme can affect the amount of data that can be sent over the wireless communication link per unit time, in an embodiment the data length can be determined based on the selected modulation and coding scheme of the communication link. Typically the plurality of probe packets is sent back-to-back, that is, with no dispersion, to permit a clearer determination of packet dispersion upon reception of the probe packets at wireless device 102.

Based on the reception of the plurality of probe packets at wireless device 102, a packet dispersion is determined of at least two of the probe packets sent to the wireless device (operation 206). Packet dispersion between two of the plurality of probe packets can be determined from the last bit of a first packet to the last bit of a subsequent next packet. Packet dispersion can result from a variety of causes. For example, packet dispersion can result from network cross-traffic, that is, data traffic other than the probe packets which intervenes between two consecutive probe packets. An increase in cross-traffic may increase dispersion, reflecting that available capacity of a communication link may change over time based on cross-traffic volume. Other network conditions, such as communication link congestion and air interface conditions, can also affect packet dispersion. In addition, packet dispersion can result from the size of the probe packets. When the communication link is heavily loaded with data traffic, the probability of cross-traffic interference with the probe packets increases.

Based on the determined packet dispersion, an average dispersion rate can be calculated (operation 208). The average dispersion rate can be based on the data length and the and determined packet dispersion. In an embodiment, an average dispersion rate of probe packets arriving at wireless device 102 can vary depending on a distance of wireless device 102 from access node 104, and may increase as the distance between wireless device 102 and access node 104 increases.

Based on the calculated average dispersion rate and the determined probe packet size, an available link capacity can be determined (operation 210). The available link capacity can be determined, for example at wireless device 102, or at access node 104 or another network node of communication system 100, based on the determined packet dispersion and average dispersion rate of probe packets received at wireless device 102.

Figure 3:
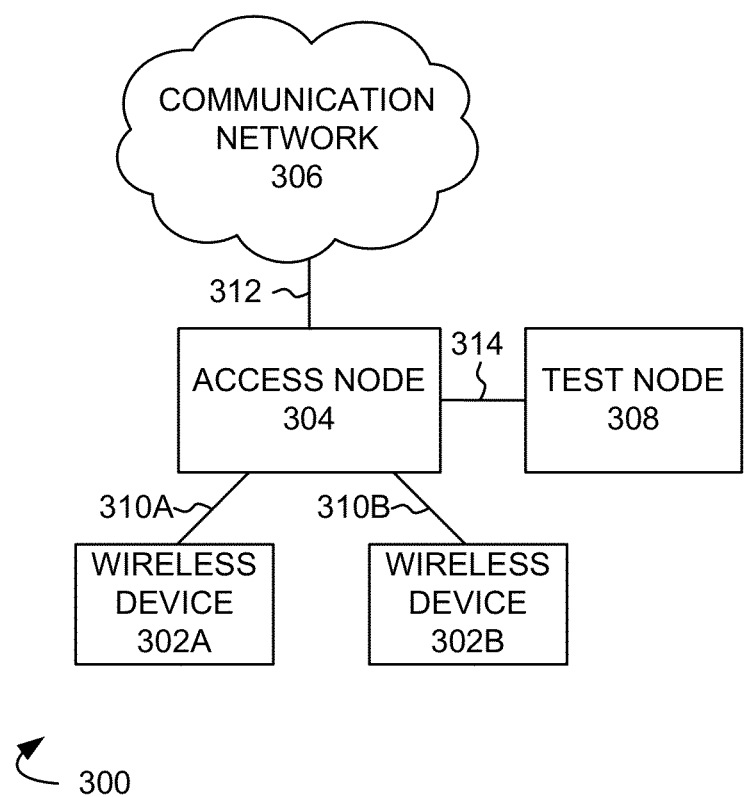
FIG. 3 illustrates another exemplary communication system to determine a link capacity between an access node and a wireless device.

FIG. 3 illustrates another exemplary communication system 300 to determine link capacity between an access node and a wireless device comprising wireless devices 302A and 302B, access node 304, communication network 306, and test node 308. Examples of wireless devices 302A and 302B can include a cell phone, a smart phone, a computing platform such as a laptop, palmtop, or tablet, a personal digital assistant, an internet access device, or other device capable of voice communication using a plurality of dialers and communication protocols, including combinations thereof. Wireless devices 302A and 302B are in communication with access node 304 over communication links 310A and 310B, respectively. Although two wireless devices are illustrated in FIG. 3, this is merely exemplary, and a greater number of wireless devices can be in communication with access node 304.

Access node 304 is a network node capable of providing wireless communications to wireless devices 302A and 302B, and can be, for example, a base transceiver station, a radio base station, an eNodeB device or an enhanced eNodeB device. Access node 304 is in communication with communication network 306 over communication link 312, and with test node 308 over communication link 314. Test node 308 is a processing node configured to determine link capacity between access node 304 and wireless devices 302A and 302B. Test node 308 can comprise a processor and associated circuitry to execute or direct the execution of computer-readable instructions for managing content. Test node 308 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

Communication network 306 can be wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 306 may also comprise a wireless network, including base stations, wireless communication nodes, telephony switches, internet routers, network gateways, computer systems, communication links, or some other type of communication equipment, and combinations thereof. Communication network can use wired and/or wireless protocols analogous to those described above regarding communication network 300.

Communication links 310A, 310B, 312 and 314 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access node 304, communication network 306 and test node 308 which are omitted for clarity, including additional processing nodes, routers, gateways, and physical and/or wireless data links for carrying data among the various network elements.

Figure 4:
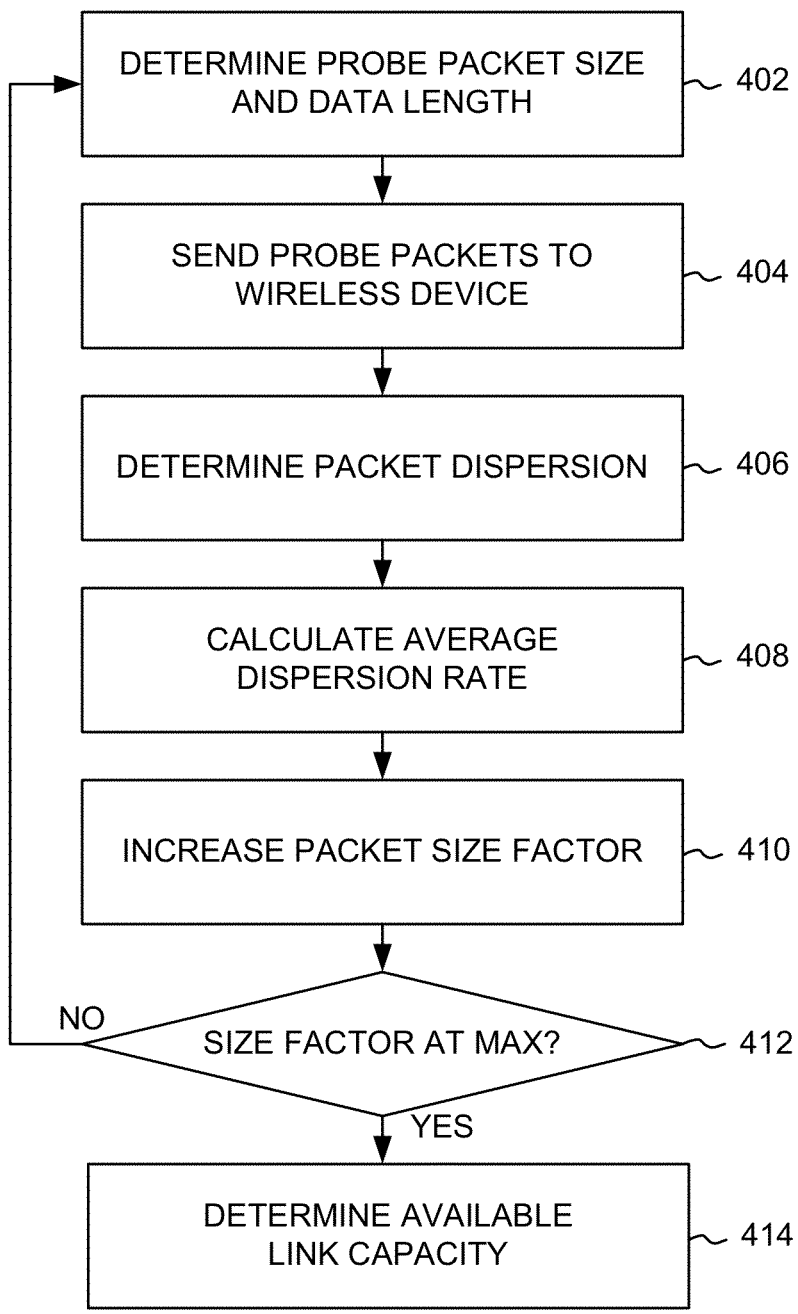
FIG. 4 illustrates another exemplary method of determining a link capacity between an access node and a wireless device.

FIG. 4 illustrates an exemplary sending of packets from an access node to a wireless device. In operation 402, a probe packet size and data length are determined. A probe packet size can be determined for a plurality of probe packets appropriate for the transmission time interval (TTI) of wireless communication system 300. In a wireless communication system employing adaptive coding and modulation to send data over a wireless communication link, the selected modulation and coding scheme can affect the amount of data that can be sent over the wireless communication link per unit time, which in turn will affect the TTI. Thus, in an embodiment, a probe packet size can be determined for a plurality of probe packets based on the MCS assigned to the communication link. In general, the larger the probe packet size, the larger the resultant dispersion of packets arriving at wireless devices 302A and 302B, because the probe packets can be fragmented into more than one TTI, which increases the susceptibility of the probe packets to separation by cross-traffic interference and other network conditions. Conversely, if probe packet size is too small, an erroneous dispersion measurement may result, as packets may be more sensitive to a time stamping resolution at a receiving device, such as wireless devices 302A and 302B. In an embodiment, a probe packet size L can be determined based on a number of bits (or symbols) that the assigned MCS can support on the communication link and the maximum number of symbols supported in the TTI (excluding overhead), which can be denoted as $\lambda_{MCS}$, and a packet size factor, $\gamma$. For example, probe packet size L can be determined as $L=\gamma*\lambda_{MCS}$.

In operation 404, a plurality of probe packets are sent from access node 304 to wireless devices 302A and 302B. Using the determined probe packet size L, a plurality of data packets of a determined data length can be sent from access node 304 to wireless devices 302A and 302B over communication links 310A and 310B. The data length can be determined to provide a sufficient number of the plurality of probe packets to determine a packet dispersion, as further described below. In an embodiment, the data length can be based on a determined network congestion. For example, when network congestion is detected, the data length can be increased with an increase in determined network congestion.

As the selected modulation and coding scheme can affect the amount of data that can be sent over the wireless communication link per unit time, in an embodiment the data length can be determined based on the selected modulation and coding scheme of the communication link. Typically the plurality of probe packets is sent back-to-back, that is, with no dispersion, to permit a clearer determination of packet dispersion upon reception of the probe packets at wireless devices 302A and 302B. In an embodiment, the data length can be a number of probe packets sent from access node 304 to wireless devices 302A and 302B. The probe packet size and the data length can also be determined so as to reduce the amount of overhead load imposed on the communication link by the plurality of probe packets. In an embodiment, the probe packet size and the data length are determined so that the amount of overhead load imposed by the plurality of probe packets does not meet an overhead threshold. In an embodiment, the plurality of probe packets can be sent with a high routing priority, such as "guaranteed bit rate" (GBR) or the like.

Figure 5:
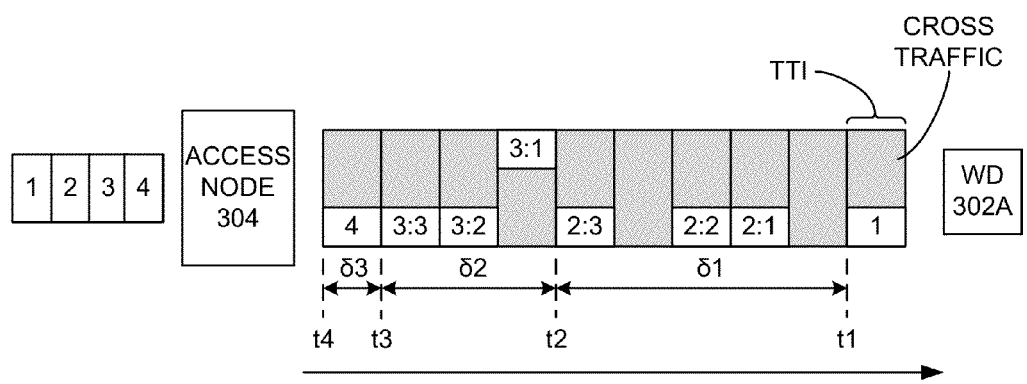
FIG. 5 illustrates an exemplary sending of packets from an access node to a wireless device.

In operation 406, based on the reception of the plurality of probe packets at wireless devices 302A and 302B, a packet dispersion is determined of at least two of the probe packets sent to the wireless device. Referring to FIG. 5, a plurality of probe packets 1-4 can be sent from access node 304 to wireless device 302A. The probe packets are sent from access node 304 with no dispersion. Packet dispersion between two of the plurality of probe packets arising on the communication link can be determined from the last bit of a first packet to the last bit of a subsequent next packet. As illustrated in FIG. 5, packet 1 can be received in a single TTI, and packet 2 can be fragmented into portions 2:1, 2:2 and 2:3 over several TTIs, such that the last portion of packet 2 includes the last bit of packet 2. Network cross-traffic is illustrated occupying the remainder of the TTI including packet 1, as well as interfering in the transmission of packets 2, 3, and 4 over the communication link. Measuring packet dispersion from the last bit of packet 1 to the last bit of subsequent packet 2, a dispersion $\delta 1$ can be determined. FIG. 5 further illustrates that packet 3 can be fragmented into portions 3:1, 3:2 and 3:3 across several TTIs, and fragment 4 can arrive in a single TTI. A dispersion $\delta 2$ can be determined from the last bit of packet 2 (in portion 2:3) to the last bit of packet 3 (in portion 3:3), and a dispersion $\delta 3$ can be determined from the last bit of packet 3 to the last bit in packet 4. As noted above, packet dispersion can result from a variety of causes, including network cross-traffic, communication link congestion and air interface conditions, as well as from the size of the probe packets themselves. For example, as illustrated in FIG. 5, packets 1-4 are of a size small enough to be transmitted in a single TTI (such as packets 1 and 4). In general, the larger the probe packet size, the greater the dispersion can be between packets, because the probe packets can be fragmented into more than one TTI (as illustrated with packets 2 and 3), which increases the susceptibility of the packets to separation by cross-traffic interference and other network conditions. Conversely, if probe packet size is too small, an erroneous dispersion measurement may result as packets may be more sensitive to the time stamping resolution at a receiving device. For example, if the time stamping resolution of a receiving device is an integer (as can be the case, for example, in an LTE wireless network), the quantum of measurement can affect the resolution of measurement, thus affecting the determination of packet dispersion, such that the packet dispersion $\delta$ can be an integer of the TTI of the wireless communication network. In an embodiment, in an absence of cross-traffic, $\gamma$ probe packets can arrive in the same TTI.

Returning to FIG. 4, based on the determined packet dispersion, an average dispersion rate can be calculated (operation 408). The average dispersion rate can be based on the data length and the determined packet dispersion. In an embodiment, an average dispersion rate of probe packets arriving at wireless devices 302A and 302B can vary depending on a distance of wireless devices 302A and 302B from access node 304, and may increase as the distance between wireless devices 302A and 302B and access node 304 increases.

In operation 410, the packet size factor γ is increased. Probe packet size L can be varied by changing the value of the packet size factor γ, for example, to generate a plurality of probe packets of different packet sizes. As packet size increases, the resultant dispersion of packets arriving at wireless devices 302A and 302B increases, and as packet size decreases, the resultant determination of dispersion becomes increasingly inaccurate. Accordingly, different values of the packet size factor γ can be used to generate a plurality of probe packets of different packet sizes. In an embodiment, the packet size factor can vary from a minimum value $γ_{min}$ to a maximum value $γ_{max}$, wherein in operation 410 the value of γ is increased or incremented to increase the probe packet size L. $γ_{min}$ can be selected to avoid packet fragmentation into more than one TTI. $γ_{max}$ can be selected based on the expected timestamping resolution at a receiving device. In an embodiment, if 0<γ<1, several packets can be placed in the same TTI, in the absence of cross traffic, and conversely, if γ>1, then a packet may require more than one TTI for transmission from access node 304 to wireless devices 302A and 302B. When the incremented value of γ does not meet $γ_{max}$ (operation 412-NO) then a probe packet size L and a data length of the plurality of probe packets is re-determined based on the assigned MCS, and a plurality of probe packets are sent to the wireless device using the new probe packet size and data length.

Figure 6:
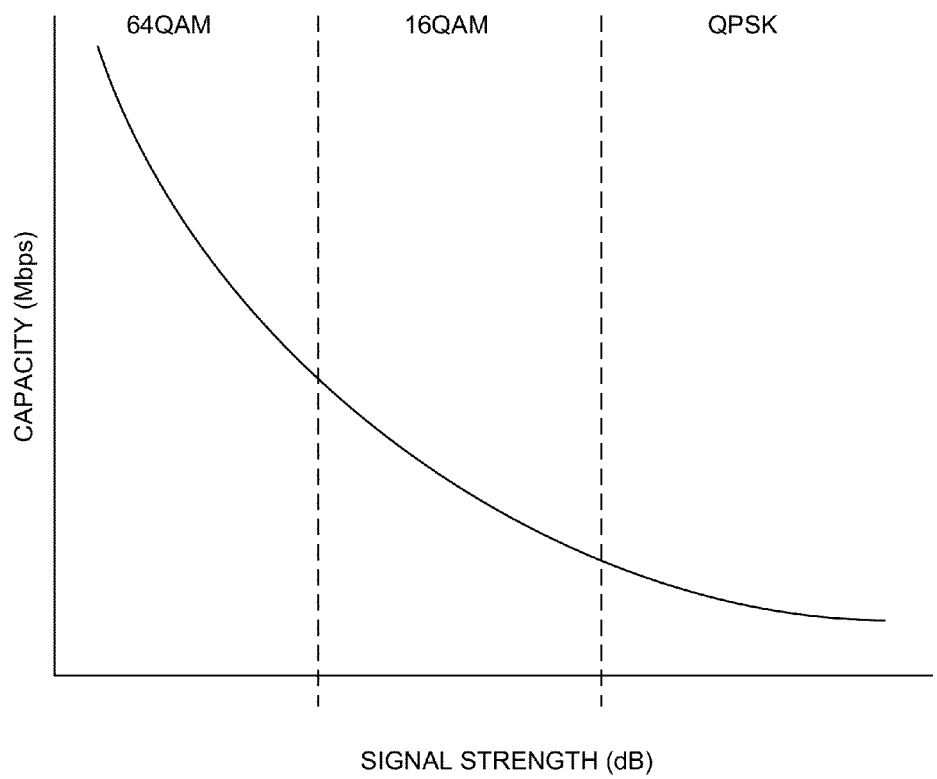
FIG. 6 illustrates an exemplary comparison of signal strength to communication link capacity.

When the incremented value of γ meets $γ_{max}$ (operation 412-YES) then in operation 414, based on the calculated average dispersion rate and the determined probe packet size, an available link capacity can be determined. The available link capacity can be determined, for example, at test node 308, or at wireless devices 302A and 302B, access node 304 or another network node of communication system 300 based on the determined packet dispersion and average dispersion rate of probe packets received at wireless devices 302A and 302B. In an embodiment, the available link capacity C can be determined as packet length per average dispersion rate (ADR), or C=L/ADR. FIG. 6 illustrates an exemplary comparison of signal strength to determine communication link capacity over a communication link assigned three different MCSs, 64QAM, 16QAM, and QPSK. A greater link capacity can be achieved with a lower signal strength using 64QAM as compared to 16QAM and QPSK MCSs.

In an embodiment, wireless devices 302A and 302B can be selected from among a plurality of wireless device in communication with access node 304 to receive a plurality of probe packets to determine a link capacity of a wireless communication link. The selection of wireless devices which are in an idle mode (that is, not actively participating in a call session or running an application requiring data from communication network 306) can be prioritized, to avoid disrupting a call or an application of the wireless device. A number of wireless devices selected can be determined to provide a wide sample of packet dispersions. A wireless device can be selected based on a variety of criteria, such as the MCS assigned to a communication link of the wireless device, a distance of the wireless device from access node 304, or a Quality of Service associated with the wireless device (wherein Quality of Service, such as a contractual guarantee of a minimum throughput is distinguished from a signal quality measurement). A wireless device can also opt-in to be selected to receive a plurality of probe packets to determine a link capacity of a wireless communication link. Additionally, a wireless device can be selected based on a type of data requested by the wireless device, or whether the wireless device is running an application which is delay sensitive (such as a Voice over Internet Protocol application, or a streaming video or audio application). Other criteria, as well as combinations of the foregoing, are also possible. In an embodiment, a number of wireless devices which meets a sample requirement threshold is selected to provide a sample of packet dispersions to accurately determine the link capacity. The sample requirement threshold can be determined based on calculations of a number of packet dispersion measurements required for an accurate determination of the link capacity.

A throughput distribution based on capacity vs. a signal strength metric (such as a signal strength determined in dB), as illustrated in FIG. 6, can be used to determine, for example, throughput provided to a wireless device. If the determined throughput meets a throughput threshold, traffic management techniques can be employed to augment the determined throughput, such as, for example, traffic shaping, or carrier augmentation. For example, access node 304 can be commanded to employ an additional carrier if the determined throughput at wireless devices 302A and/or 302B meets a throughput threshold. As another example, access node 304 can be commanded to prioritize traffic to wireless devices 302A and/or 302B if the determined throughput at wireless devices 302A and/or 302B meets a throughput threshold.

Figure 7:
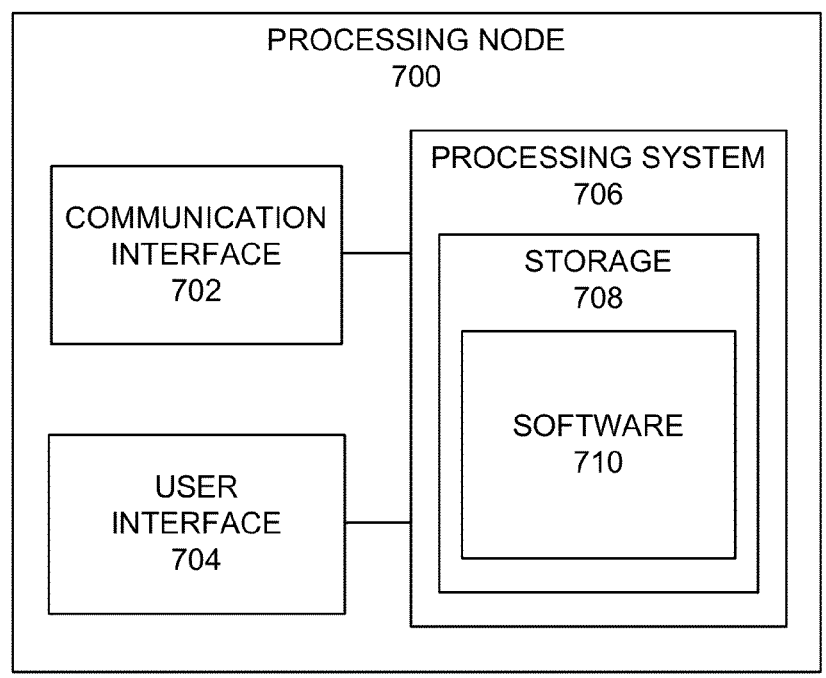
FIG. 7 illustrates an exemplary processing node.

FIG. 7 illustrates an exemplary processing node comprising communication interface 702, user interface 704, and processing system 706 in communication with communication interface 702 and user interface 704. Processing node 700 is capable of determining a link capacity between an access node and a wireless device in a wireless communication network. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes test node 308. Processing node 700 can also be an adjunct or component of a network element, such as an element of access node 104 or access node 304. Processing node 700 can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of determining a link capacity between an access node and a wireless device in a wireless communication network, comprising:
    sending over a communication link from the access node to the wireless device a plurality of packets comprising a packet size and a data length based on a modulation and coding scheme (MCS) assigned to the communication link;
    determining a dispersion of at least two of the packets sent to the wireless device;
    calculating an average dispersion rate based on the determined dispersion of the at least two packets and the data length; and
    determining an available link capacity based on the packet size and the average dispersion rate.

2. The method of claim 1, wherein the packet size and data length are based on an MCS assigned to the communication link and an overhead load of the plurality of packets.

3. The method of claim 1, wherein the dispersion is an integer of a transmission time interval of the wireless communication network.

4. The method of claim 1, further comprising:
    selecting a second packet size and a second data length based on the MCS assigned to the communication link; and
    sending to the wireless device over the communication link a second plurality of packets comprising the second packet size and a second data length.

5. The method of claim 4, wherein the first packet size is based on a first packet size factor and a maximum number of symbols supported by the MCS assigned to the communication link, and the second packet size is based on a second packet size factor which is larger than the first size factor and the MCS assigned to the communication link.

6. The method of claim 1, wherein the packet size is based on a packet size factor and a maximum number of symbols supported by the MCS assigned to the communication link.

7. The method of claim 1, wherein the data length is selected based on a determined network congestion.

8. The method of claim 4, wherein the first packet size is based on a first packet size factor and a maximum number of symbols supported by the MCS assigned to the communication link,
    wherein the second packet size is based on a second packet size factor larger than the first packet size and the MCS assigned to the communication link, and
    wherein selecting a second packet size, sending a second plurality of packets, and increasing the second packet size factor are repeated until the packet size factor reaches a maximum packet size factor.

9. The method of claim 8, further comprising:
    determining a first dispersion of at least two of the packets sent to the wireless device of the first packet size and a second dispersion of at least two of the packets sent to the wireless device of the second packet size;
    calculating an average dispersion rate based on the determined first and second dispersions and the first and second data lengths; and
    determining an available link capacity based on the first packet size, the second packet size and the average dispersion rate.

10. A method of determining a link capacity between an access node and a plurality of wireless devices in a wireless communication network, comprising:
    sending through a communication link from the access node to each wireless device a plurality of packets comprising a packet size and a data length based on a modulation and coding scheme (MCS) assigned to the communication link for each wireless device;
    determining a dispersion of at least two of the packets sent to each wireless device;
    calculating an average dispersion rate based on the determined dispersion of the at least two packets and the data length; and
    determining an available link capacity based on the packet size, the average dispersion rate, and the MCS assigned to the communication link for each wireless device.

11. The method of claim 10, further comprising:
    selecting a second packet size and a second data length based on the MCS assigned to the communication link for each wireless device; and
    sending to each wireless device a second plurality of packets comprising the second packet size and a second data length.

12. The method of claim 11, wherein the first packet size is based on a first packet size factor and a maximum number of symbols supported by the MCS assigned to the communication link,
    wherein the second packet size is based on a second packet size factor larger than the first packet size and the MCS assigned to the communication link, and
    wherein selecting a second packet size, sending a second plurality of packets, and increasing the second packet size factor are repeated until the packet size factor reaches a maximum packet size factor.

13. The method of claim 10, wherein the packet size is based on packet size factor and a maximum number of symbols supported by the MCS assigned to the communication link.

14. The method of claim 10, further comprising:
    determining a throughput distribution based on the available link capacity and a signal strength metric for each wireless device, and
    performing one of traffic shaping and augmenting available carriers when the determined subscriber speed distribution meets a subscriber speed threshold.

15. A system for determining a link capacity between an access node and a wireless device in a wireless communication network, comprising:
  a processing node configured to:
    send over a communication link from the access node to the wireless device a plurality of packets comprising a packet size and a data length based on a modulation and coding scheme (MCS) assigned to the communication link;
    determine a dispersion of at least two of the packets sent to the wireless device;
    calculate an average dispersion rate based on the determined dispersion of the at least two packets and the data length; and
    determine an available link capacity based on the packet size and the average dispersion rate.

16. The system of claim 15, further comprising:
  selecting a second packet size and a second data length based on the MCS assigned to the communication link; and
  sending to the wireless device over the communication link a second plurality of packets comprising the second packet size and a second data length.

17. The system of claim 16, wherein the first packet size is based on a first packet size factor and a maximum number of symbols supported by the MCS assigned to the communication link, wherein the second packet size is based on a second packet size factor larger than the first packet size and the MCS assigned to the communication link, and wherein selecting a second packet size, sending a second plurality of packets, and increasing the second packet size factor are repeated until the packet size factor reaches a maximum packet size factor.

18. The system of claim 17, wherein the processing node is further configured to: further comprising:
  determine a first dispersion of at least two of the packets sent to the wireless device of the first packet size and a second dispersion of at least two of the packets sent to the wireless device of the second packet size;
  calculate an average dispersion rate based on the determined first and second dispersions and the first and second data lengths; and
  determine an available link capacity based on the first packet size, the second packet size and the average dispersion rate.

19. The system of claim 15, wherein the packet size is based on a packet size factor and a maximum number of symbols supported by the MCS assigned to the communication link.

20. The system of claim 19, wherein the first packet size is based on a first packet size factor and a maximum number of symbols supported by the MCS assigned to the communication link, and the second packet size is based on a second packet size factor which is larger than the first size factor and the MCS assigned to the communication link.

\* \* \* \* \*